(12) United States Patent
Davis

(10) Patent No.: US 6,935,486 B2
(45) Date of Patent: Aug. 30, 2005

(54) BUSHING SYSTEM FOR LIVE ROLLER CONVEYOR

(75) Inventor: O'Neal Wright Davis, Pike Road, AL (US)

(73) Assignee: Production Automation, Inc., Montgomery, AL (US)

( * ) Notice: Subject to any disclaimer, the term of this patent is extended or adjusted under 35 U.S.C. 154(b) by 0 days.

(21) Appl. No.: 10/228,961

(22) Filed: Aug. 28, 2002

(65) Prior Publication Data

US 2004/0050670 A1 Mar. 18, 2004

(51) Int. Cl.$^7$ .............................................. B65G 13/06
(52) U.S. Cl. ........................ 198/781.02; 198/781.04; 198/791; 193/35 R; 193/37
(58) Field of Search ...................... 198/781.01, 781.02, 198/781.08, 781.04, 791, 781.07; 193/35 R, 37

(56) References Cited

U.S. PATENT DOCUMENTS

| | | | |
|---|---|---|---|
| 1,425,499 A | * 8/1922 | Lewis | 414/159 |
| 1,759,220 A | * 5/1930 | Brown | 198/780 |
| 3,559,782 A | * 2/1971 | Lesley et al. | 193/37 |
| 3,610,406 A | * 10/1971 | Fleischauer et al. | 198/789 |
| 3,815,196 A | * 6/1974 | Gotham et al. | 193/37 |
| 3,840,102 A | * 10/1974 | Dawson | 193/35 R |
| 3,946,880 A | 3/1976 | Schmitt | |
| 3,954,190 A | 5/1976 | Howard et al. | |
| 4,006,816 A | * 2/1977 | Werntz | 198/781.04 |
| 4,053,039 A | * 10/1977 | Shuttleworth | 193/35 R |
| 4,063,632 A | 12/1977 | Neth et al. | |
| 4,067,456 A | 1/1978 | Schmitt | |
| 4,127,264 A | 11/1978 | Fayolle | |
| 4,162,016 A | 7/1979 | Schmitt | |
| 4,164,998 A | 8/1979 | DeGood et al. | |
| 4,314,629 A | * 2/1982 | Shilander et al. | 198/500 |
| 4,505,381 A | * 3/1985 | Major | 198/781.02 |
| 4,524,861 A | 6/1985 | Matsushita | |
| 4,645,056 A | * 2/1987 | Palazzolo et al. | 193/35 A |
| 4,681,203 A | * 7/1987 | Kornylak | 193/35 R |
| 5,092,447 A | 3/1992 | Wyman | |
| 5,096,050 A | * 3/1992 | Hodlewsky | 198/779 |
| 5,105,935 A | 4/1992 | Kohl | |
| 5,107,982 A | 4/1992 | Walter | |
| 5,161,673 A | 11/1992 | Cairns | |
| 5,195,627 A | 3/1993 | Wyman | |
| 5,655,642 A | * 8/1997 | Lawrence et al. | 193/37 |
| 5,660,262 A | 8/1997 | Landrum et al. | |
| 5,810,157 A | 9/1998 | Nolan | |
| 5,971,137 A | 10/1999 | Grant et al. | |
| 6,042,061 A | * 3/2000 | Shimizu | 248/55 |
| 6,209,702 B1 | * 4/2001 | Agnoff | 193/37 |
| 6,367,618 B1 | * 4/2002 | Szuba | 198/791 |
| 6,454,082 B1 | * 9/2002 | McTaggart et al. | 198/781.02 |
| 6,464,217 B1 | * 10/2002 | Kulpa et al. | 271/116 |
| 6,516,940 B1 | * 2/2003 | Hart et al. | 198/781.1 |

FOREIGN PATENT DOCUMENTS

GB          820514      * 9/1959

* cited by examiner

*Primary Examiner*—Richard Ridley
(74) *Attorney, Agent, or Firm*—Hunton & Williams

(57) ABSTRACT

The invention provides an improved live roller conveyor system for preventing damage to conveyed cases of goods when stopped upon live rollers. In an embodiment of the invention, a live roller comprises a drive shaft with a plurality of roller members rotatably affixed thereto. One or more bushings are provided between an inner surface of each roller member and an outer surface of said drive shaft. When a conveyed case is stopped along the conveyor, for example, during case layer formation for loading onto a pallet, the rollers underneath the case stop rotating relative to the drive shaft due to slippage between the bushings and drive shaft.

5 Claims, 3 Drawing Sheets

BUSHING SYSTEM FOR LIVE ROLLER CONVEYOR

FIELD OF INVENTION

The present invention relates generally to rollers for conveying loads along a conveyor and, more particularly, to a bushing system for powered rollers within a live roller conveyor.

DESCRIPTION OF RELATED ART

Roller conveyors are commonly used in many industries to move loads from one point to another. One type of conveyor is a live (i.e., powered) roller conveyor. Live roller conveyors have a plurality of rollers driven by an electric motor. The rollers are engaged, directly or indirectly, by a case of goods being moved or conveyed. It should be understood that "cases" is intended to mean any type of good(s), which are typically packaged, or loads that can be conveyed from one point to another. Rotation of the rollers moves the goods in a desired direction along the conveyor. Driving torque is typically communicated from the electric motor to each roller by a drive system, which commonly comprises one or more belts, gears, chains, and/or sprockets to drive a drive shaft. A number of different types of live roller conveyors have been developed such as, but not limited to those described in U.S. Pat. Nos. 4,164,998; 5,105,935; 5,107,982; 5,810,157; and 5,971,137; each of which is incorporated in its entirety herein by reference.

A drawback to the employment of conventional live roller conveyor systems is the substantial likelihood of conveyed cases being damaged during accumulation or stoppage along the conveyor, particularly during palletizing. Palletizing is the process of automatically stacking cases onto a pallet. Cases are stacked onto pallets in layers with or without paperboard slipsheets separating the layers. The pallet facilitates the transportation of a significant number of cases from a manufacturer through distribution and ultimately to the end user. When palletizing cases, a portion of the cases must be temporarily stopped or rotated along a live roller conveyor to allow other cases to be positioned along side and/or behind each other. For example, a typical in-feed section of a palletizer can comprise one or more case turners, mini stops, and side pushers, and like devices to orient multiple cases on a live roller conveyor into a layer to be loaded onto a pallet. Damage may occur to either individual rollers or cases when the rollers continue to rotate under a stopped case. Particularly, friction between a rotating roller and a stopped case causes heat to build up, thereby possibly damaging or even destroying the case and/or the roller. To complicate matters, over-wrap plastic film is often applied to a group of goods to form a case, which can stick to the roller during stoppage of the case. Accordingly, the plastic film can be frequently pulled off, thereby leading to possible destruction of the case and/or a machine jam of the conveyor itself.

Stalling or stoppage of cases in conventional conveyor systems causes the roller drive motor to require more power to keep the rollers rotating at a constant speed. An oversized motor may be needed to ensure that the motor will not be stalled. One approach typically used to minimize the risk of damage and excess energy consumption is to provide a clutching mechanism between the roller and the drive gear. When a roller experiences drag torque exceeding a predetermined magnitude, as might occur with the stoppage of cases, the clutch slips, allowing the roller to stop rotating even though the drive belt and sprocket keep moving. For many clutching systems, the torque at which the clutch slippage occurs either cannot be adjusted at all or cannot be adjusted very easily. Some known power roller conveyors rely on an axial deflection of springs, such as wave washers or Belleville springs, to generate a clutching preload. In some such power roller conveyors, there is relative rotation between the elements that axially contain the springs, either when the rollers are rotating or when they are stalled. This relative rotation can cause the springs to wear and deteriorate, decreasing the axial load that the springs are able to provide and/or causing them to break.

In an attempt to prevent damage to a case, one conventional technique employs coating the live rollers with a slick film or liquid. Ideally, the slick film or liquid decreases the friction between a stopped case and the roller. However, coating a roller with a lubricating film or liquid is costly and generally unreliable because of the continual need to maintain an adequate amount of film or liquid on the roller. For example, the slick film or liquid may escape the roller due to gravity, centrifugal force, or adherence to the cases passing over.

U.S. Pat. No. 4,314,629 to Shilander et al., the disclosure of which is incorporated herein in its entirety, discloses an accumulating conveyor featuring a power roller comprising a passageway with a friction drive member formed of powdered metal and impregnated with a lubricant positioned therein. The friction drive member is in frictional engagement with the roller and rotates conjointly with a drive shaft. Rotation of the drive shaft is transmitted by the friction drive member to propel the articles along the conveyor. When the movement of the article is restrained, the friction drive member slips in the passageway relative to the roller member so that the roller member remains motionless. However, one disadvantage with such a system is the costly and labor intensive assembly of rollers with a lubricant and powdered metal inside. Moreover, the powdered metal and lubricant is prone to leaking.

U.S. Pat. No. 5,161,673 to Cairns, the disclosure of which is also incorporated herein in its entirety, discloses a conveyor roller system having a frictional drive transmission component as the last link between the drive power source and the live portion of the roller. The frictional surface of the drive component extends around the entire inner surface of the live portion of the roller. The frictional drive transmission component allows the live portion of the roller to stop moving in the event of accumulation of the articles to be transported. One disadvantage of this system is that the frictional drive transmission component is provided only to one end of the roller where the power transmission component (e.g., sprocket, pulley, or drive wheel) resides. Accordingly, driving torque is transmitted only to one end of the roller, thereby possibly leading to a power gradient along the longitudinal length of the roller and a non-constant frictional force, which is dependent on the location of the conveyed article along the roller. Moreover, this invention is limited in that only one live roller can be present along a drive shaft.

U.S. Pat. No. 4,524,861 to Matsushita, the disclosure of which is also incorporated herein in its entirety, discloses a driving roller comprising a pressure plate provided at one end face of a roller, which is spring biased for frictionally engaging that roller end face via a bushing, which is integrally fitted within the roller. One disadvantage of such a system is it requires a recess to be provided at one end of each roller along the conveyor, i.e., one end features a larger central bore than that throughout the remainder of the roller, to integrate the bushing with the roller, thereby increasing the labor and cost associated with the manufacture of each roller. Moreover, because force is applied at one end of the roller along the longitudinal axis of the roller, the opposite end has to apply an equal and opposite force to maintain the roller in place, thereby placing wear and tear on the roller. Moreover, this invention is limited in that only one live roller can be present along a drive shaft.

SUMMARY OF THE INVENTION

The present invention overcomes these and other deficiencies of the related art by providing a live roller conveyor system featuring a live roller comprising multiple roller members rotatably supported by one or more bushings disposed on a single drive shaft.

In an embodiment of the invention, a live roller for conveying loads comprises a drive shaft, a plurality of roller members rotatably affixed to the drive shaft, and one or more bushings provided between an inner surface of each roller member and an outer surface of the drive shaft. Preferably, a bushing is provided at each end of a roller member and comprises a rim extending from the end to protect adjacent roller members from wearing against one another. The bushings are preferably constructed of brass, bronze, plastic, wood, or a combination thereof. The roller members comprise steel or plastic with or without a rubber outer coating.

In another embodiment of the invention, a live roller conveyor system comprises at least two live rollers as described herein, such that adjacent live rollers are substantially parallel and oriented in opposite directions.

An advantage of the invention is that it minimizes, if not eliminates, damage to conveyed goods and rollers caused by friction between rotating rollers and stopped cases. Another advantage is that only the roller members underneath a stopped or rotated case slip relative to the drive shaft, thereby allowing adjacent roller members along the same shaft to convey other cases. Moreover, rubber roller members provide improved gripping of cases and absorb vertical movement of the cases.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE PREFERRED EMBODIMENTS

Figure 1:
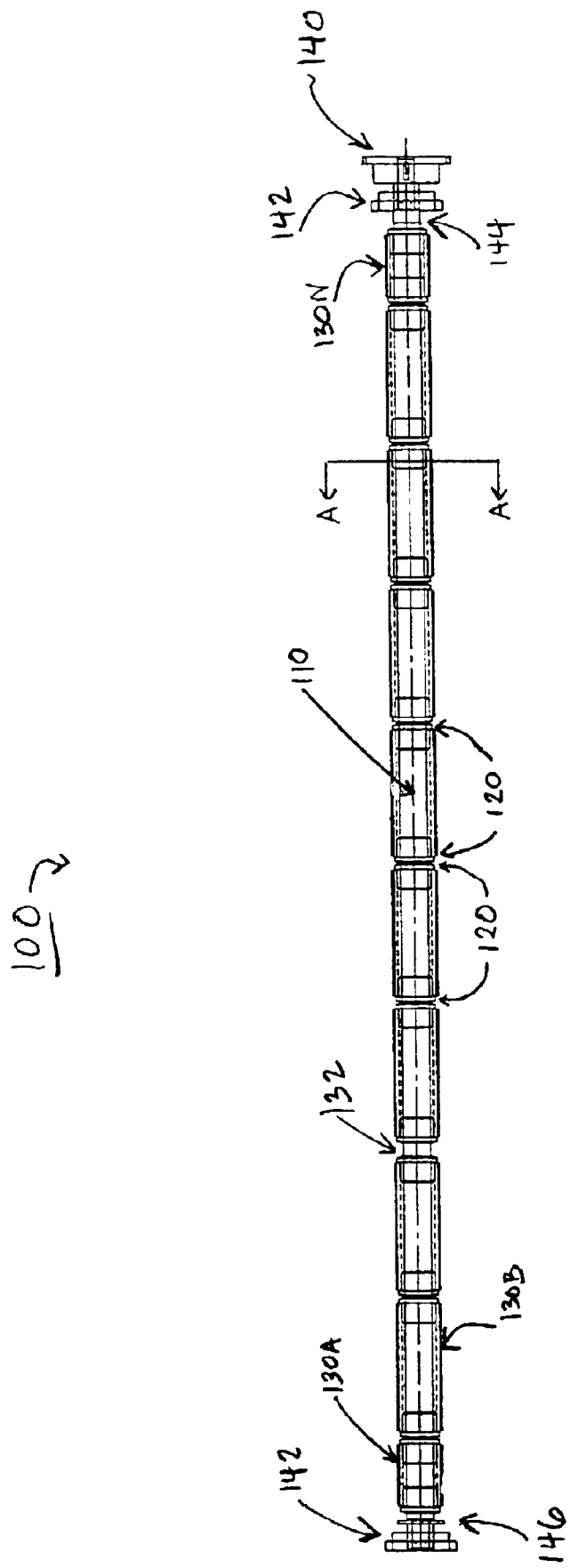
FIG. 1 illustrates a live roller according to an embodiment of the invention.
Figure 2:
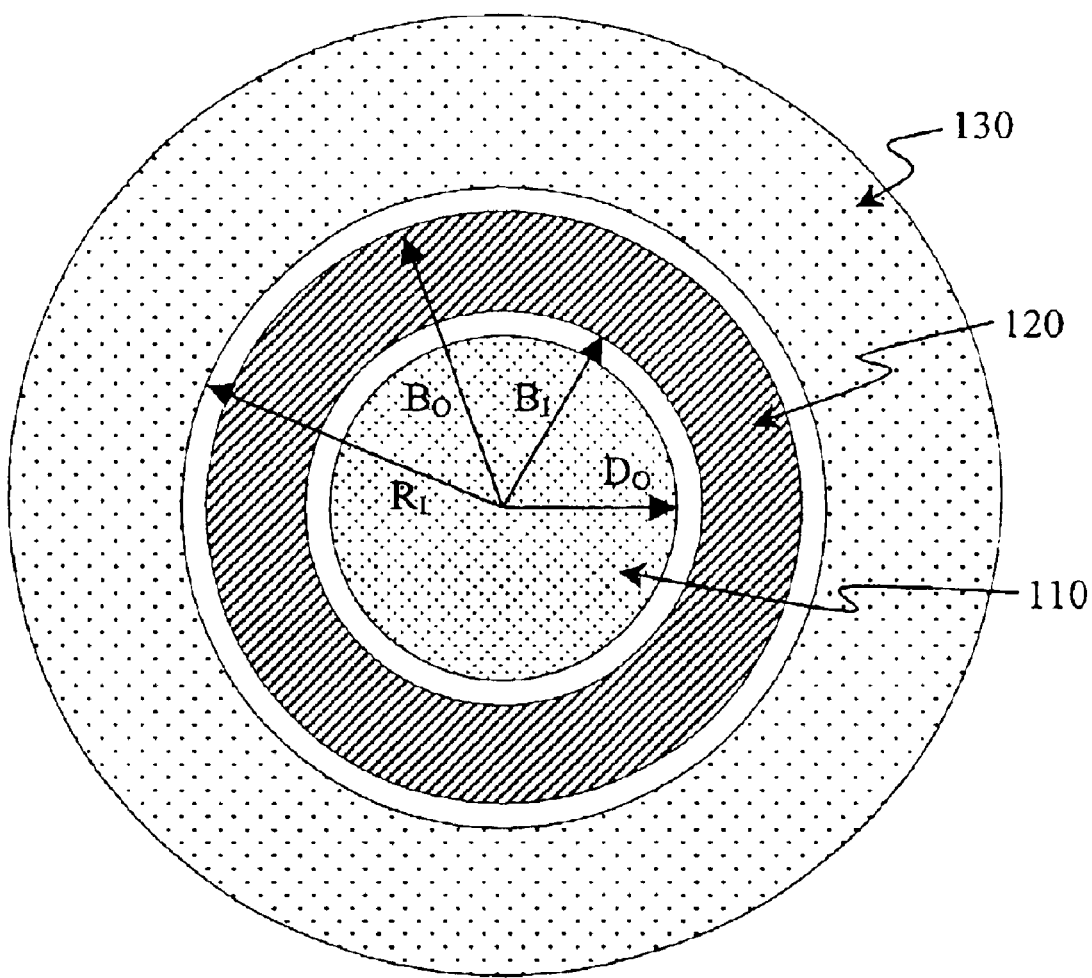
FIG. 2 illustrates a cross-sectional view taken along plane A—A in FIG. 1.
Figure 3:
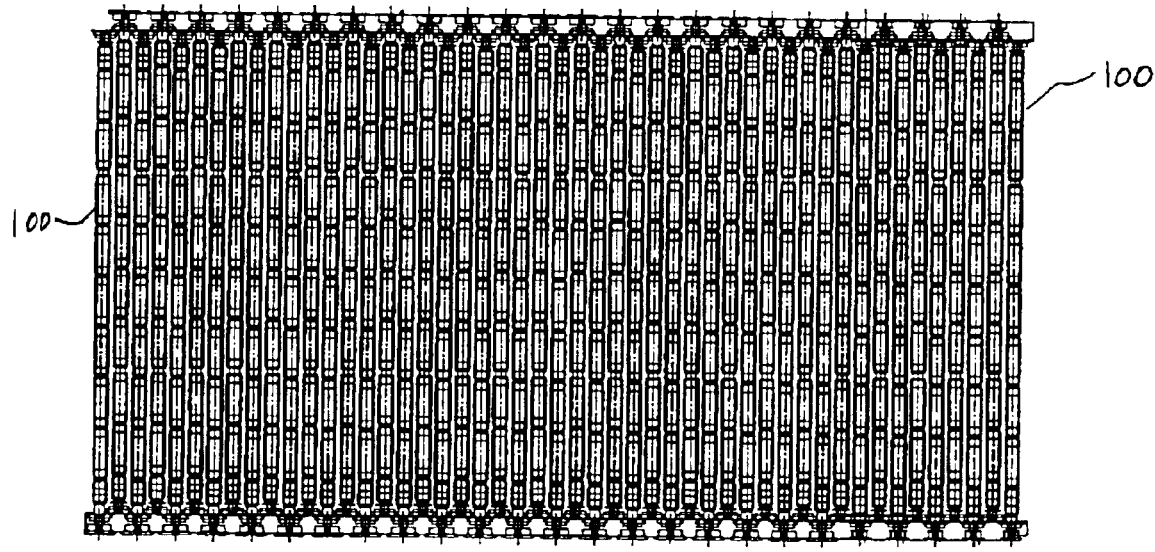
FIG. 3 illustrates a live roller conveyor system according to an embodiment of the invention.

Preferred embodiments of the present invention and their advantages may be understood by referring to FIGS. 1–3, wherein like reference numerals refer to like elements, and are described in the context of a live roller conveyor system implemented in an in-feed section of a palletizer wherein case goods are positioned into a layer to be loaded onto a pallet. Nevertheless, the present invention is applicable to conveyors for transporting loads in general and any other system employing roller members driven by a drive shaft.

FIG. 1 illustrates a live roller 100 according to an embodiment of the invention for use in a live roller conveyor system. Live roller 100 comprises a drive shaft 110, a number of bushings 120, and a number (N) of roller members 130. A drive sprocket 140 is fixedly attached to an end of drive shaft 110 to provide linkage to a drive system (not shown), the implementation of which is apparent to one of ordinary skill in the art. For example, a belt or chain (not shown) can be employed to link drive sprocket 140 to a drive motor (not shown). The use of drive sprocket 140 is exemplary only in that alternative linking means, the identification and implementation of which is apparent to one of ordinary skill in the art, can be used to provide torque to drive shaft 110. Live roller 100 may further comprise two bearings 142, a snap ring 144, and a washer 146. Each bearing 142 provides a bearing surface between a conveyor frame (not shown) and drive shaft 110 at opposite ends of live roller 100 as shown. For example, a first bearing 142 is affixed to drive shaft adjacent to drive sprocket 140, and a second bearing 142 is affixed at the opposite end. Bearings 142 can be any type of conventional bearing, the implementation of which is apparent to one of ordinary skill in the art, and may or may not rotate with drive shaft 110. Snap ring 144 is placed in between first bearing 142 and roller member 130N. Opposite therefrom, washer 146 is placed between second bearing 142 and roller member 130A. Generally, live roller 100 is mounted to a conveyor frame (not shown) at each end, specifically, at a first location in between first bearing 142 and drive sprocket 140, and at a second location in between second bearing 142 and washer 146, in such a way that drive shaft 110, bushings 120, and roller members 130 may rotate. The use and configuration of bearings 142, snap ring 144, and washer 146 are exemplary only and alternative mounting systems, the identification and implementation of which is apparent to one of ordinary skill in the art, can be used to rotatably affix live roller 100 to a conveyor frame.

A plurality of bushings 120 and roller members 130 are provided on drive shaft 110 in between bearings 142. Rollers members 130 are substantially cylindrical and comprise a passageway along its axis to permit drive shaft 110 to pass through. Each roller member 130 is preferably coaxial with drive shaft 110. Bushings 120 are disposed in between an outer surface of drive shaft 110 and an inner surface of roller members 130. For example, if drive shaft 110 and roller members 130 are cylindrically shaped, bushings 120 are disposed between an outer radius of drive shaft 110 and an inner radius of roller members 130. Nevertheless, inner and outer radii of adjacent roller members 130 need not be identical. In an embodiment of the invention, a single bushing 120 is provided at each end of a roller member 130, thereby providing two bushings per roller member 130. Accordingly, twenty (20) bushings 120 are employed in a ten (10) roller member 130 configuration disposed on drive shaft 110. Optionally, bushings 120 can be flanged or provided with a protective rim at the end protruding from each roller member 130 as shown in order to prevent adjacent roller members 130 from contacting one another directly and to prevent bushings 120 traveling along drive shaft 110 relative to roller members 130. In a related embodiment, a single bushing 120 can be provided for one or more roller members 130. For example, a single bushing having a length equal to or greater than the length of one roller member can be disposed on the drive shaft. Increasing the length of a bushing 120, i.e., the surface in contact with a roller member 130, generally increases the driving power transmitted to a roller member 130.

The particular longitudinal lengths of roller members 130 can be varied, particularly, depending on the dimensions of the cases being conveyed. Moreover, adjacent roller members 130 within live roller 100 may be identical or different in length. In a preferred embodiment, outer roller members 130A and 130N are shorter than inner roller members 130B to 130(N−1) to enable case stoppers and turners within an in-feed section of a palletizer to efficiently orient cases. For example, if a case is turned about one of its corners, wherein the axis of rotation is located over roller member 130A, only a small portion of live roller 100 stops, e.g., only roller member 130A, while one or more adjacent larger roller members, e.g., 130B+, continue to deliver power, thereby rotating the case. An optional space 132 can be provided between one or more adjacent roller members 130 to ensure a relatively loose fit between all adjacent roller members 130A–N. For example, a loose fit allows adjacent roller members 130 to slip relative to one another, thereby allowing one roller member to be stopped when an adjacent roller member remains powered. A tighter fit increases the load between adjacent roller members 130, thereby possibly causing adjacent rollers to drive each other through the rims of their respective adjacent bushings. One of ordinary skill in the art recognizes that outer roller members 130A and 130N, and inner roller members 130B to 130(N−1) can be varied in length to suit the particular dimensions of the conveyed goods. For example, the diagonal, side length, or longest cross-length of the contact surface of a conveyed length, can be substantially equal to an integer multiple of the length of the outer roller members 130A and 130N, and/or inner roller members 130B to 130(N−1). In a related embodiment, case goods are conveyed only along a portion of live roller 100 comprising the inner rollers 130B to 130(N−1). As such, roller members 130A and 130N are provided to fill in the remaining space along live roller 100.

FIG. 2 illustrates a cross-sectional view of live roller 100 taken along the plane A—A and featuring drive shaft 110, a single bushing 120, and a concentric single roller member 130. As shown, the inner radius of bushing 120 ("$B_I$") is provided at or near an outer radius of drive shaft 110 ("$D_O$"). The outer radius of bushing 120 ("$B_O$") is provided at or near the inner radius of roller member 130 ("$R_I$"), which is constant throughout the length of the member. Preferably, a clearance, i.e., unoccupied space, between drive shaft 110 and bushing 120 (e.g., $B_I$-$D_O$), and/or a clearance between bushing 120 and roller 130 (e.g., $R_I$-$B_O$) remains, the magnitude of which can be adjusted to vary the amount of drive power transmitted from drive shaft 110 to roller 130. For example, increasing these clearances generally decreases the drive power transmitted to roller 130. In a preferred embodiment, a clearance of approximately 0.005" is provided between driveshaft 110 and bushing 120, while a tight clearance, i.e., a clearance substantially less than 0.005", is provided between bushing 120 and roller member 130, thereby allowing bushing 120 to slip relative to drive shaft 110 and not relative to roller member 130.

In an exemplary embodiment, bushings 120 comprise brass, bronze, plastic, wood, or other suitable material durable enough to withstand the relative rotation of metal drive shaft 110 and/or roller member 130. Roller members 130 comprise a conventional roller material, such as, but not limited to steel or plastic. In a preferred embodiment, roller members 130 are coated with a relatively soft material, such as rubber, to allow the rollers to better grip a case and to gently absorb case bouncing when cases are loaded onto the conveyor, thereby allowing conveyor speed to be increased. In a related embodiment, a steel roller member 130 can comprise a plastic outer coating.

In operation, the weight of a case conveyed over live roller 100 provides enough friction at the inner and outer surfaces of bushings 120 such that roller member 130 rotates with drive shaft 110 to convey the case. When a case is stopped over live roller 100 by, for example, a stopper, case turner, or the general accumulation of cases, the friction at the inner and outer surfaces is overcome to allow roller member 130 to "slip" relative to drive shaft 110.

FIG. 3 illustrates a live roller conveyor system 300 according to an embodiment of the invention. Particularly, conveyor system 300 comprises a number of live rollers 100 mounted in parallel to a conveyor frame (not shown). Preferably, adjacent live rollers 100 are mounted in an alternating fashion such that drive sprocket 140 of each adjacent live roller 100 is at an opposite end to allow for a drive system (not shown) to be connected to each side of the conveyor frame. A "zig-zag" pattern, i.e., two adjacent roller members each on an adjacent live roller are offset, as shown can be provided to efficiently rotate and/or stop cases along the conveyor system 300. In operation, when a case is stopped or rotated along conveyor system 300, the roller members 130 underneath can slip relative to their respective drive shaft 110. However, because multiple roller members 130 are provided along a single drive shaft 110, those roller members not underneath the case continue to rotate and can convey other cases around the stopped case. Therefore, multiple cases can be oriented into a layer for loading onto a pallet. In a related embodiment, conveyor system 300 can comprises single roller member live rollers or non-powered rollers intermixed with live rollers 100.

Although the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A live roller assembly for transporting loads comprising:

a drive shaft driven at a first speed;

at least three roller members for contacting and supporting the loads, each of the at least three roller members being mounted on and concentrically with the drive shaft and having a first and a second end;

each of the at least three roller members having a first bushing mounted to the respective first end thereof and a second bushing mounted to the respective second end thereof, the first and second bushings each being provided between an inner surface of the respective roller member and an outer surface of the drive shaft;

wherein the at least three roller members are each driven through friction by the drive shaft, the drive shaft transferring torque through friction to the respective roller member to propel the loads, and each of the at least three roller members can slip relative to the drive shaft when the respective roller member is supporting a load and turn at a speed different from the first speed of the drive shaft wherein the remaining roller members that are not supporting loads are driven by the drive shaft at the first speed;

wherein the at least three roller members are mounted on the drive shaft such that one of the first bushing or the second bushing of a respective roller member can come in contact with one of the first bushing or the second bushing of each adjacent roller member on the drive shaft; and wherein a roller member located closest to an end of the drive shaft is shorter than at least one of the remaining roller members.

2. The live roller assembly of claim 1 wherein the first bushings and the second bushings cooperate to prevent adjacent roller members from coming into contact with one another.

3. The live roller assembly of claim 1, wherein of the first bushing and the second bushing of at least one of the at least three roller members are spaced from one another by an annular space.

4. A live roller assembly for transporting loads comprising:
- a drive shaft driven at a first speed;
- at least three roller members for contacting and supporting the loads, each of the at least three roller members being mounted on and concentrically with the drive shaft and having a first and a second end;
- each of the at least three roller members having a first bushing mounted to the respective first end thereof and a second bushing mounted to the respective second end thereof, the first and second bushings each being provided between an inner surface of the respective roller member and an outer surface of the drive shaft;
- wherein the at least three roller members are each driven through friction by the drive shaft, the drive shaft transferring torque through friction to the respective roller member to propel the loads, and each of the at least three roller members can slip relative to the drive shaft when the respective roller member is supporting a load and turn at a speed different from the first speed of the drive shaft wherein the remaining roller members that are not supporting loads are driven by the drive shaft at the first speed;
- wherein each of the at least three roller members has a rubber outer surface; and
- wherein a roller member located closest to an end of the drive shaft is shorter than at least one of the remaining roller members.

5. A live roller assembly for transporting loads comprising:
- a drive shaft driven at a first speed;
- at least three roller members for contacting and supporting the loads, each of the at least three roller members being mounted on and concentrically with the drive shaft and having a first and a second end;
- each of the at least three roller members having a first bushing mounted to the respective first end thereof and a second bushing mounted to the respective second end thereof, the first and second bushings each being provided between an inner surface of the respective roller member and an outer surface of the drive shaft;
- wherein the at least three roller members are each driven through friction by the drive shaft, the drive shaft transferring torque through friction to the respective roller member to propel the loads, and each of the at least three roller members can slip relative to the drive shaft when the respective roller member is supporting a load and turn at a speed different from the first speed of the drive shaft wherein the remaining roller members that are not supporting loads are driven by the drive shaft at the first speed;
- wherein a fit between the first and second bushings and a respective roller member is tighter than a fit between the drive shaft and the first and second bushings whereby the slipping of each of the at least three roller members relative to the drive shaft occurs between the drive shaft and the first and second bushings; and
- wherein a roller member located closest to an end of the drive shaft is shorter than at least one of the remaining roller members.

* * * * *